United States Patent
Xiang et al.

(10) Patent No.: US 12,136,259 B2
(45) Date of Patent: Nov. 5, 2024

(54) METHOD AND APPARATUS FOR DETECTING FACE, COMPUTER DEVICE AND COMPUTER-READABLE STORAGE MEDIUM

(71) Applicant: BIGO TECHNOLOGY PTE. LTD., Singapore (SG)

(72) Inventors: Wei Xiang, Guangzhou (CN); Chao Pei, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 356 days.

(21) Appl. No.: 17/780,840

(22) PCT Filed: Aug. 20, 2020

(86) PCT No.: PCT/CN2020/110160
§ 371 (c)(1),
(2) Date: May 27, 2022

(87) PCT Pub. No.: WO2021/103675
PCT Pub. Date: Jun. 3, 2021

(65) Prior Publication Data
US 2023/0023271 A1    Jan. 26, 2023

(30) Foreign Application Priority Data
Nov. 29, 2019   (CN) .......................... 201911205613.8

(51) Int. Cl.
*G06V 10/776*   (2022.01)
*G06N 3/044*    (2023.01)
(Continued)

(52) U.S. Cl.
CPC ........ *G06V 10/776* (2022.01); *G06V 10/7747* (2022.01); *G06V 10/82* (2022.01); *G06V 40/161* (2022.01)

(58) Field of Classification Search
CPC ...... G06N 3/044; G06N 3/0442; G06N 3/045; G06N 3/0464; G06N 3/08; G06N 3/0985;
(Continued)

(56) References Cited

U.S. PATENT DOCUMENTS

2002/0152074 A1 * 10/2002 Junqua .................... G10L 13/04
704/260
2019/0114537 A1   4/2019 Wesolowski et al.
(Continued)

FOREIGN PATENT DOCUMENTS

CN   107909142 A    4/2018
CN   109190458 A    1/2019
(Continued)

OTHER PUBLICATIONS

International Search Report of the International Searching Authority for State Intellectual Property Office of the People's Republic of China in PCT application No. PCT/CN2020/110160 issued on Nov. 19, 2020, which is an international application corresponding to this U.S. application.
(Continued)

*Primary Examiner* — Asghar H Bilgrami
(74) *Attorney, Agent, or Firm* — Kolitch Romano Dascenzo Gates LLC

(57) ABSTRACT

A method for training a neural network, including: determining a neural network; training the neural network at a first learning rate according to a first optimization mode, where the first learning rate is updated each time the neural network is trained; mapping the first learning rate of the first optimization mode to a second learning rate of a second optimization mode in the same vector space; determining the second learning rate satisfies a preset update condition; and continuing to train the neural network at the second learning rate according to the second optimization mode.

13 Claims, 5 Drawing Sheets

(51) Int. Cl.
- *G06N 3/0442* (2023.01)
- *G06N 3/045* (2023.01)
- *G06N 3/0464* (2023.01)
- *G06N 3/08* (2023.01)
- *G06N 3/0985* (2023.01)
- *G06V 10/774* (2022.01)
- *G06V 10/82* (2022.01)
- *G06V 40/16* (2022.01)

(58) Field of Classification Search
CPC .. G06V 10/7747; G06V 10/776; G06V 10/82; G06V 40/16; G06V 40/161
See application file for complete search history.

(56) References Cited

U.S. PATENT DOCUMENTS

| | | | | |
|---|---|---|---|---|
| 2019/0147305 | A1* | 5/2019 | Lu | G06F 18/2413 382/157 |
| 2020/0064444 | A1* | 2/2020 | Regani | G01S 7/417 |
| 2021/0406516 | A1* | 12/2021 | Chen | G06V 10/82 |

FOREIGN PATENT DOCUMENTS

| | | | | |
|---|---|---|---|---|
| CN | 109272046 | A | 1/2019 | |
| CN | 109508678 | A * | 3/2019 | ......... G06F 18/2413 |
| CN | 109947940 | A | 6/2019 | |
| CN | 109978079 | A | 7/2019 | |
| CN | 110414349 | A | 11/2019 | |
| CN | 110942142 | A * | 3/2020 | ......... G06K 9/00221 |

OTHER PUBLICATIONS

The State Intellectual Property Office of People's Republic of China, First Office Action in Patent Application No. CN201911205613.8 issued on May 11, 2021, which is a foreign counterpart application corresponding to this U.S. Patent Application, to which this application claims priority.

Extended European Search Report Communication Pursuant to Rule 62 EPC, dated May 25, 2023 in Patent Application No. EP 20892477.9, which is a foreign counterpart application to this U.S. Application.

Kaziakhmedov, Edgar et al., "Real-world adversarial attack on MTCNN face detection system", arxiv . org, Cornell University Library, 201 Olin Library Cornell University Ithaca, NY 14853, Oct. 14, 2019, entire document.

* cited by examiner

METHOD AND APPARATUS FOR DETECTING FACE, COMPUTER DEVICE AND COMPUTER-READABLE STORAGE MEDIUM

CROSS-REFERENCE TO RELATED APPLICATION

This application is a U.S. national stage of international application No. PCT/CN2020/110160, filed on Aug. 20, 2020, which claims priority to Chinese Patent Application No. 201911205613.8, filed on Nov. 29, 2019, the disclosures of which are herein incorporated by reference in their entireties.

TECHNICAL FIELD

The present disclosure relates to a deep learning technology, such as a method and an apparatus for detecting a face, and a computer device and a computer-readable storage medium.

BACKGROUND

A deep learning method based on a neural network is widely applied in many fields such as computer vision, natural language processing, and text understanding, and these fields basically cover many technologies such as image and video processing, voice processing, and text processing required by Internet applications.

The neural network is used in deep learning as a feature extraction tool for data. Parameters in the neural network are trained by a large number of samples, and annotations of the samples, such as types, are fitted, thereby getting the predictive ability in scenarios similar to the sample distribution.

In general cases, a user sets learning goals, such as labels for classification, as well as a position and size of an annotated box for target object detection. In the training process, an objective function is defined to calculate an error between a predicted value of a current neural network and an annotated actual value, and the error is also called a loss value, and then an optimization mode is used to update the parameters of the neural network.

The goal of the optimization mode is to update the parameters of the neural network to reduce the loss value, that is, to minimize the loss value of the objective function as much as possible.

Therefore, the neural network is trained toward its decreasing gradient, and parameters are updated according to a specific learning rate (also called a step size).

Parameters are updated in most of the optimization modes for the neural network in the related art by using the results of a learning rate and an objective function. The learning rate of the optimization mode determines a parameter update range, and has a great effect on the training of the neural network. The neural network in the related art is usually trained using a single optimization mode, which is easy to ignore the requirements of other aspects while meeting the requirements of one aspect.

For example, the learning rate has an effect on a speed and generalization ability of training a neural network: if the learning rate is too small, the training speed of the neural network will be relatively slow, resulting in a long training period and affecting the training efficiency of the neural network; and if the learning rate is too large, optimal parameters are likely to be skipped, resulting in a relatively poor generalization ability of the neural network.

SUMMARY

A method for detecting a face is provided. The training method includes: receiving image data; and identifying a region in the image data where face data is located by inputting the image data into a preset neural network for processing, wherein the preset neural network is trained by a method for training a neural network and the method for training a neural network includes:
  determining a neural network;
  training the neural network at a first learning rate according to a first optimization mode, wherein the first learning rate is updated each time the neural network is trained;
  mapping the first learning rate of the first optimization mode to a second learning rate of a second optimization mode in the same vector space;
  determining the second learning rate satisfies a preset update condition; and
  continuing to train the neural network at the second learning rate according to the second optimization mode;
  wherein the mapping the first learning rate of the first optimization mode to the second learning rate of the second optimization mode in the same vector space includes:
  determining an update range, wherein the update range represents a range for updating a first network parameter in a case that the neural network is trained at the first learning rate according to the first optimization mode, and the first network parameter represents a parameter of the neural network in a case that the neural network is trained at the first learning rate according to the first optimization mode;
  determining a parameter gradient of a second network parameter, wherein the second network parameter represents a parameter of the neural network in a case that the neural network is trained at the second learning rate according to the second optimization mode; and
  determining a projection of the update range on the parameter gradient in the same vector space as the second learning rate of the second optimization mode.

An apparatus for detecting a face is further provided. The apparatus is configured to implement the method for detecting a face according to the present disclosure.

A computer device is further provided. The computer device includes:
  one or more processors; and
  a memory configured to store one or more programs therein, wherein
  the one or more programs, when executed by the one or more processors, causes the one or more processors to implement the method for training a neural network or the method for detecting a face according to the present disclosure.

A computer-readable storage medium is further provided. The computer-readable storage medium is configured to store a computer program therein, wherein the computer program, when executed by a processor, causes the processor to implement the method for training a neural network or the method for detecting a face according to the present disclosure.

DETAILED DESCRIPTION

The present disclosure will be described below in conjunction with the accompanying drawings and embodiments. For ease of description, only the parts but all of structures related to the present disclosure are shown in the accompanying drawings.

A neural network in deep learning is usually composed of layers with different functions. Taking a convolutional neural network (CNN) used in computer vision as an example, CNN usually contains a large number of convolutional layers, activation layers, pooling layers, and so on.

Each layer calculates input data through a functional expression expressed by parameters stored in this layer and obtains output data, which is taken as input data of the next layer.

Figure 1:
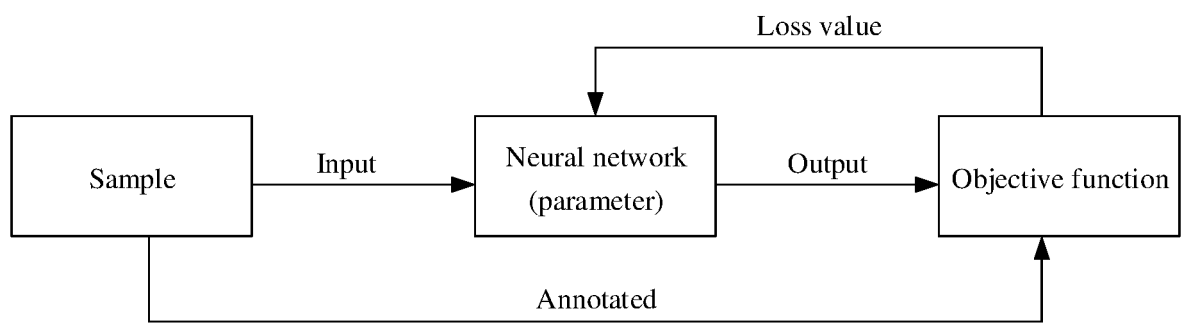
FIG. 1 is a schematic diagram of a training of a neural network provided by an embodiment of the present disclosure.

Therefore, as shown in FIG. 1, the neural network may be regarded as a function mapping, and a training process of the neural network is a process of function optimization and solution. An object of the optimization solution is to continuously update the parameters contained in the neural network, use annotated samples as input data, and minimize a loss value between an output predicted value and an annotation after the calculation of the neural network.

The training process of the neural network is a process of parameter update: calculating a gradient of an objective function in a current parameter, then calculating an update range of the parameter according to the loss value and a learning rate, and updating the parameter in a direction opposite to the gradient.

Assuming that the parameter of the neural network is represented as w and the objective function is f, a parameter gradient $g_t$ of the objective function at a $t^{th}$ moment may be expressed as:

$$g_t = \nabla_{w_{t-1}} f(w_{t-1})$$

wherein $\nabla_{w_{t-1}}$ refers to a gradient of a layer (having a parameter w) in the neural network when the neural network is optimized at a $(t-1)^{th}$ moment, or generically refers to gradients of all layers of the entire neural network at the $(t-1)^{th}$ moment.

Therefore, when the learning rate is a, the update range of the parameter at the $t^{th}$ moment may be expressed as:

$$\Delta w_t = -a_t \cdot g_t$$

The update at a $(t+1)^{th}$ moment may be expressed as:

$$w_{t+1} = w_t + \Delta w_t$$

It can be seen from the method for updating the parameter that the solution process of the neural network mainly depends on the parameter at the current moment, the definition of the objective function, and the learning rate.

Since the parameters of the neural network are generally initialized randomly and then learn according to samples, the parameter at the current moment depends on the distribution of the samples and an update status of the parameter at the previous moment. The definition of the objective function is determined according to different tasks, for example, a Softmax function can be used for a classification task, a Smooth LI function can be used for a position regression task, and so on.

The learning rate determines a parameter update speed. Since it is unknown whether the direction of the parameter update at the current moment is towards the optimal solution, it is desirable to update the parameter as quickly as possible towards the optimal solution not to update the parameter as much as possible towards other directions. However, it is difficult to set the learning rate. If the learning rate is too small, the neural network will not be able to converge, which greatly affects the efficiency of training; and if the learning rate is too large, the parameters of the neural network will hover in an oscillating range which affects the generalization ability of the neural network and is also a problem that should be avoided as much as possible in the training process.

As the parameters of the neural network are updated, the learning rate also needs to be changed appropriately. Therefore, a reasonable setting of a learning strategy and the learning rate is very important for the efficiency and generalization ability of the neural network.

According to the setting status of the learning rate, the optimization modes of the neural network in related technologies are mainly divided into two categories: one category is an optimization mode of manually setting the learning rate represented by a stochastic gradient descent (SGD) algorithm; and the other category is an optimization mode of adaptively setting the learning rate represented by adaptive moment estimation (Adam).

The SGD method is basically the same as the updating method for the above parameters. However, in actual use, for the consideration of the training efficiency and hardware limitations, it is generally selected to perform training on data in batches in one iteration process, and this batch is referred to as mini-batch. In general cases, it is selected to calculate the gradients and update parameters within one batch. Therefore, this iteration process is also called mini-batch gradient descent (MBGD). The learning rate at a moment is manually set regardless of SGD or MBGD.

As a representative optimization mode, SGD has obvious shortcomings.

1. If the manually set learning rate is too small, the convergence rate will be very slow; and if it is too large, the objective function will oscillate or even deviate from a minimum value.

2. The same learning rate is applied to all parameter updates, which is less flexible; and if the data is sparse, it is more desirable to make a bigger update for features that occur less frequently.

3. If the objective function is a non-convex function, it is also necessary to avoid getting trapped in a local minimum, or at a saddle point. Since the gradients of all dimensions around the saddle point are close to 0, SGD as a representative optimization mode is easily trapped at the saddle point.

The so-called saddle point is a local lowest point of a smooth function. Curved surfaces or hypersurfaces lie on different sides of a tangent line of this point.

Figure 2:
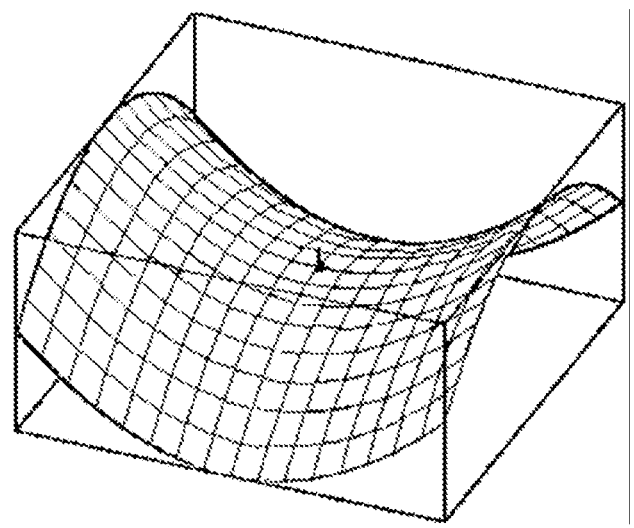
FIG. 2 is an example diagram of a saddle point provided by an embodiment of the present disclosure.

As shown in FIG. 2, for a three-dimensional model $z=x^2-y^2$, its shape is similar to a saddle, it curves upward in a horizontal axis direction and curves downward in a vertical axis direction, and the saddle point is (0, 0).

In order to suppress the oscillation of SGD, a stochastic gradient descent with momentum (SGDM) method has emerged. SGDM believes that the inertia, that is, momentum, may be added to the gradient descent process. That is, when the update range is calculated, not only the status at the current moment, but also the gradient of the previous update needs to be considered. SGDM introduces a first-order momentum based on SGD. The first-order momentum is a weighted value of the gradient at each moment in a moving direction. The first-order momentum of the parameter at the $t^{th}$ moment may be expressed as:

$$m_t = \emptyset(g_1, g_2, \ldots, g_t)$$

and the calculation method is as follows:

$$m_t = \beta_1 \cdot m_{t-1} + (1-\beta_1) \cdot g_t$$

wherein $m_t$ represents the first-order momentum (in a descending direction) at the $t^{th}$ moment; $m_{t-1}$ represents the first-order momentum at the $(t-1)^{th}$ moment; $\emptyset$ is a method for solving a current parameter update direction by using the previous gradient; $g_t$ represents a parameter gradient (including a direction and a movement amount) at the $t^{th}$ moment; and $\beta_1$ is a hyperparameter (which is generally set to an empirical value, e.g., 0.9) of the first-order momentum.

It can be seen from the above formula that the first-order momentum is approximately equal to an average value of sums of the gradient vectors at the most recent $1/(1-\beta_1)$ moments. In addition, $m_t$ is determined not only by a gradient direction of the current point, but also by the previously accumulated descending direction. $\beta_1$ is generally set to 0.9, which means that the descending direction is mainly determined by a recorded historical descending direction and is slightly biased towards the descending direction of the current moment. In this way, the possibility of oscillation can be greatly reduced, and the convergence of a model can be accelerated to a certain extent. The update status of the current parameter may be calculated according to the momentum and learning rate:

$$\Delta w_t = -a_t \cdot m_t$$

SGDM introduces the first-order momentum; and some subsequent optimization modes further introduce a second-order momentum, such as Adam, based on the SGDM. The second-order momentum is a sum of squares of the gradient values at respective moments, and may be expressed as:

$$V_t = \varphi(g_1, g_2, \ldots, g_t)$$

and the calculation method is as follows:

$$V_t = \sum_{\tau=1}^{t} g_\tau^2$$

In consideration of the inertial definition of momentum, the calculation method may be adjusted as:

$$V_t = \beta_2 \cdot V_{t-1} + (1-\beta_2) \cdot g_t^2$$

$\beta_2$ is a hyperparameter of the second-order momentum (which is generally set to an empirical value, e.g., 0.999), and the first-order momentum in, is combined:

$$m_t = \beta_1 \cdot m_{t-1} + (1-\beta_1) \cdot g_t$$

The parameter update that introduces the second-order momentum may be expressed as:

$$\Delta w_t = -\frac{a_t \cdot m_t}{\sqrt{V_t + \varepsilon}}$$

wherein $\varepsilon$ is a minimal value added to avoid a denominator from being 0; in the course of initialization, and $m_0$ and $V_0$ are both 0. Since $\beta_1$ and $\beta_2$ are relatively large, both $m_t$ and $V_t$ will be close to 0 in the initial stage. In order to correct an error of this adaptive algorithm, $m_t$ and $V_t$ are often subjected to error correction according to the following formulas:

$$\widetilde{m}_t = \frac{m_t}{1 - \beta_1^t}$$

$$\widetilde{v}_t = \frac{V_t}{1 - \beta_2^t}$$

wherein $\widetilde{m}_t$ is the corrected $m_t$; $\widetilde{v}_t$ is the corrected $V_t$; $\beta_1^t$ is a hyperparameter, which is used to control how much of the first-order momentum obtained at the $t^{th}$ moment is determined by the previous moment; and $\beta_2^t$ is a hyperparameter, which is used to control how much of the second-order momentum obtained at the $t^{th}$ moment is determined by the previous moment.

When $\beta_1^t$ and $\beta_2^t$ are both close to 1, $m_t$ and $V_t$ are approximate to $m_{t-1}$ and $V_{t-1}$, i.e., are completely determined by the first-order momentum and the second-order momentum of the previous moment; and when $\beta_1^t$ and $\beta_2^t$ are both 0, $\beta_1^t$ and $\beta_2^t$ have no any relationship with the first-order momentum and the second-order momentum of the previous moment, i.e., are completely determined by $g_t$ and $g_t^2$ of the current moment respectively.

It can be seen from the parameter update formula of the second-order momentum that the learning rate essentially becomes $a_t/\sqrt{V_t+\varepsilon}$ at this time. In addition, the more frequently (the larger $V_t$) the parameter is updated, the smaller the learning rate is. Therefore, an initial learning rate is set as $a_0$ (which may also be regarded as $a_0=a_1=\ldots=a_t$). In Adam, the learning rate is not required to be changed manually, mere an initial learning rate is set and an adaptive learning rate can be calculated for each parameter, so it performs better for sparse feature parameters However, Adam also has some problems at the same time.

1. The second-order momentum $V_t$ is accumulated over a fixed window period, and training data of the neural network may change dramatically over time. Therefore, the $V_t$ is caused to be sometimes large and sometimes small, which affects the oscillation of the learning rate in the later stage of training, resulting in a relatively poor convergence effect and affecting the generalization ability.

2. When the neural network trained with Adam is close to convergence, the learning rate basically consists of a small or large learning rates. Such extreme learning rate has a potentially adverse effect on the performances of the neural network.

Embodiment 1

Figure 3:
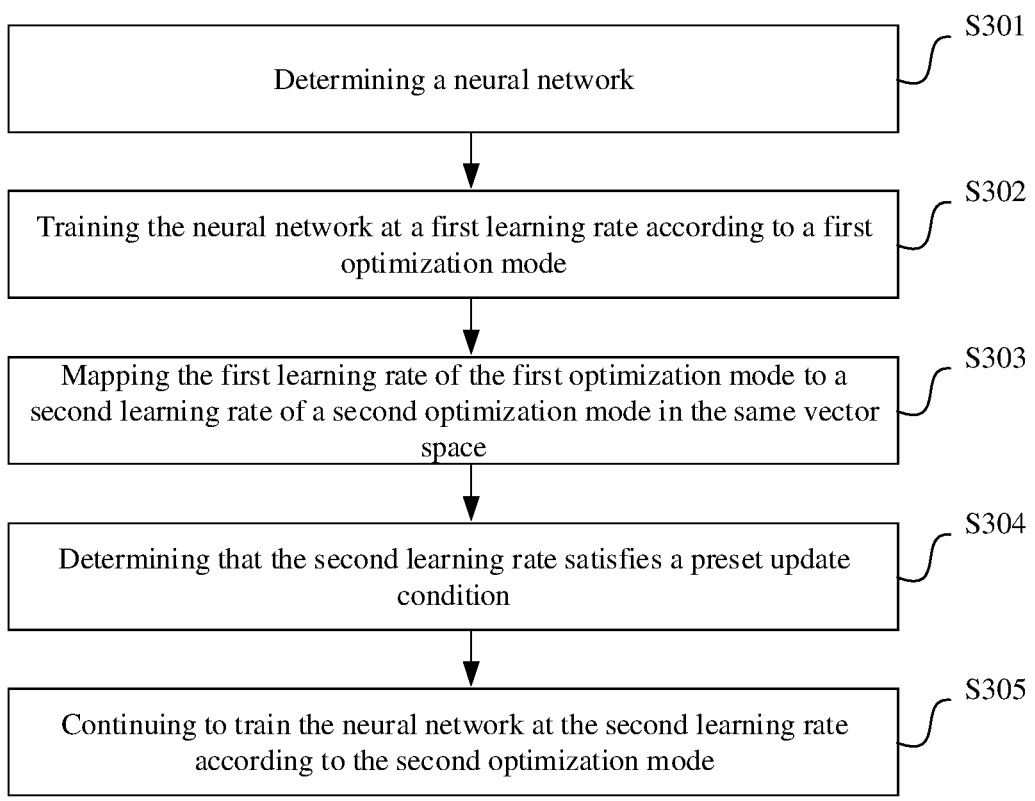
FIG. 3 is a flowchart of a method for training a neural network provided by Embodiment 1 of the present disclosure.

FIG. 3 is a flowchart of a method for training a neural network provided by Embodiment 1 of the present disclosure. This embodiment can be applied to a case where two or more optimization modes are used to train the neural network. This method can be performed by an apparatus for training a neural network, the apparatus for training a neural network may be implemented by software and/or hardware, and may be configured in a computer device, such as a server, a workstation or a personal computer. This method includes the following steps S301 to S305.

In S301, a neural network is determined.

The neural network, also known as artificial neural network (ANN), is of an algorithmic mathematical model that imitates behavioral features of an animal neural network and performs a distributed parallel information processing.

According to performances, neural networks can be divided into continuous networks and discrete networks, or deterministic networks and random networks.

According to topological structures, the neural networks can be divided into forward networks and feedback networks.

According to learning methods, the neural networks can be divided into supervised learning networks and unsupervised learning networks.

According to the properties of connection synapses, the neural networks can be divided into first-order linear association networks and higher-order nonlinear association networks.

In this embodiment, the neural network may include, but is not limited to, at least one of the followings.

1. Deep Neural Network (DNN)

The neural network is an extension of a perceptron based on the perceptron, and DNN may be understood as a neural network with many hidden layers. A multi-layer neural network and a deep neural network DNN are essentially the same, and DNN is sometimes called multi-layer perceptron (MLP).

DNN has the following limitations:

(1). Expansion in number of parameters. Since DNN adopts a fully-connected form, the connection in the structure brings weight parameters of orders of magnitude, which not only easily leads to overfitting, but also easily falls into local optimum.

(2). Local optimum. With the deepening of the neural network, an optimization function is more likely to fall into the local optimum and deviate from the true global optimum. For limited training data, the performances are even inferior to a shallow network.

(3). Gradient disappearance. Using a sigmoid activation function (transfer function), the gradient will decay in the case of back propagation (BP) gradient. As the number of layers of the neural network increases, the decay accumulates and the gradient is basically 0 when it reaches the bottom layer.

(4). Inability to model changes in a time series. The time series of samples are very important for applications such as natural language processing, speech recognition, and handwriting recognition.

2. CNN

It is mainly aimed at the expansion in the number of parameters in DNN. For CNN, not all neurons in the upper and lower layers can be directly connected, but through convolution kernels as intermediaries. The same convolution kernel can be shared among a plurality of images, and the images can still retain an original positional relationship through the convolution operation.

Because of a feature that CNN limits the number of parameters and exploits local structures, CNN is suitable for image recognition.

3. Recurrent Neural Network (RNN)

In view of the limitation that CNN cannot model the changes in a time series, and in order to adapt to the processing of time series data, the RNN appears.

In an ordinary fully connected network or CNN, a signal of each layer of neurons can only be propagated to the upper layer, and the processing of samples is independent at each moment (this is called a feedforward neural network). However, in RNN, the output of neurons can directly act on itself at the next timestamp.

The final result $O(t+1)$ of the network at the $(t+1)^{th}$ moment is the result of the combined action of the input at this time and all histories, which achieves the purpose of modeling the time series.

However, RNN may be regarded as a neural network transmitted in time, the depth of RNN refers to the length of time, and the phenomenon of gradient disappearance appears on the time axis.

In this embodiment, a person skilled in the art can select a suitable neural network as a model and wait for training according to actual needs, for example, object (e.g., faces, garbage, characters, license plates or traffic lights) detection in the image field, disease identification in the medical field, predictive analysis (such as sales, financial allocation between products, capacity utilization) in the financial domain, etc.

For example, if it is desirable to recognize handwritten digit characters, LeNet-5 in CNN may be selected.

For another example, if face detection and alignment are required, multi-task convolutional neural networks (MTCNN) in CNN may be selected.

For another example, if natural language processing, such as machine translation, speech recognition or sentiment analysis is required, a long short-term memory (LSTM) network in RNN may be selected.

In addition to the network structure in the related art, a person skilled in the art may also adjust the network structure of the neural network according to actual situations, which will not be limited in this embodiment.

In S302, the neural network is trained at a first learning rate according to a first optimization mode.

In this embodiment, in two adjacent stages, for the selected neural network, the neural network may be trained at the first learning rate according to the first optimization mode in the previous stage; and this neural network is continued to be trained at a second learning rate according to a second optimization mode switched from the first optimization mode and the first learning rate.

The first optimization mode and the second optimization mode are both optimization modes, also known as optimization algorithms, optimization solution methods, etc., which are related to different optimization modes in different stages of training the neural network.

Both the first learning rate and the second learning rate belong to learning rates, which are directed for different learning rates in different stages of training the neural network.

The first optimization mode and the second optimization mode differ in two or more dimensions for training the neural network.

In an example, these dimensions include a training speed of the neural network and a generalization ability of the neural network.

The speed of training the neural network with the first optimization mode is greater than the speed of training the neural network with the second optimization mode; and the generalization ability of the neural network trained with the first optimization mode is lower than the generalization ability of the neural network trained with the second optimization mode.

The generalization ability refers to an ability of the neural network to adapt to fresh samples; and the purpose of learning is to learn a rule hidden behind the samples. For data other than samples with the same rule, the trained network can also provide an appropriate output.

In this embodiment, the first optimization mode includes adaptive moment estimation Adam and other optimization modes of adaptively setting the learning rate; and the second optimization mode includes stochastic gradient descent SGD and other optimization modes of manually setting the learning rate.

Therefore, the neural network which is trained with the adaptive moment estimation Adam in the previous stage can ensure the training speed of the neural network and achieve rapid descent convergence; and the neural network which is trained with stochastic gradient descent SGD can ensure the generalization ability of the neural network, which not only solves the problem of insufficient generalization ability of the neural network trained with adaptive moment estimation Adam, but also solves the problem of slow speed of training the neural network with stochastic gradient descent SGD.

The above-mentioned first optimization mode and second optimization mode are only taken as examples. In the course of implementing the present embodiment, other first optimization modes and second optimization modes may be set according to actual dimensions. For example, resources occupied by training the neural network with the first optimization mode are fewer than resources occupied by training the neural network with the second optimization mode, and the generalization ability of the neural network trained with the first optimization mode is lower than the generalization ability of the neural network trained with the second optimization mode; or resources occupied by training the neural network with the first optimization mode are fewer than resources occupied by training the neural network with the second optimization mode, and the speed of training the neural network with the first optimization mode is greater than the speed of training the neural network with the second optimization mode, which will not be limited in this embodiment. Moreover, in addition to the above-mentioned first optimization mode and second optimization mode, a person skilled in the art may also adopt other first optimization modes and second optimization modes according to actual needs, which are not limited in this embodiment.

In S303, the first learning rate of the first optimization mode is mapped to the second learning rate of the second optimization mode in the same vector space.

In this embodiment, the neural network trained with the first optimization mode is in the same vector space as the neural network trained with the second optimization mode, such that the first learning rate of the first optimization mode is mapped to the second learning rate of the second optimization mode.

Training the neural network with the first optimization mode is iterative. A value of the first learning rate of the first optimization mode is updated each time the neural network is trained; and the first learning rate of the first optimization mode is mapped to the second learning rate of the second optimization mode each time the first learning rate of the first optimization mode is updated.

In S304, it is determined that the second learning rate satisfies a preset update condition.

In this embodiment, an update condition may be preset, for example, within a preset value range, the value converges, and the number of updates exceeds a preset threshold, etc. If the second learning rate satisfies the update condition, the second optimization mode can be switched.

In S305, the neural network is continued to be trained at the second learning rate according to the second optimization mode.

If the second learning rate converges, the neural network is continued to be trained at the second learning rate according to the second learning rate switched from the first optimization mode and the first learning rate.

During convergence, the second learning rate of the second optimization mode is generally small. Therefore, after the use of the first optimization mode, the value of the second learning rate can be kept unchanged, and the neural network can be directly trained at the second learning rate.

When the neural network is trained with the second optimization mode, since the training of the neural network is iterative, the value of the second learning rate may also be updated in this embodiment each time the neural network is trained, which is not limited in this embodiment.

In one case, the training of the neural network includes two stages. In the first stage, the neural network is trained at the first learning rate according to the first optimization mode; and meanwhile, the first learning rate of the first optimization mode is mapped to the second learning rate of the second optimization mode, and the first stage is switched to the second stage when the second learning rate converges. In the second stage, the neural network is continued to be trained at the second learning rate according to the second optimization mode till the training of this neural network is completed.

In other cases, the training of the neural network includes more than two stages. Among two of the more stages, in the previous stage, the neural network is trained at the first learning rate according to the first optimization mode; and meanwhile, the first learning rate of the first optimization mode is mapped to the second learning rate of the second optimization mode, and the previous stage is switched to the later stage when the second learning rate converges. In the later stage, the neural network is continued to be trained at the second learning rate according to the second optimization mode. Before these two stages, the neural network may be trained at other learning rates according to other optimization modes, that is, the neural network is continued to be trained at the first learning rate according to the first optimization mode switched from other optimization modes and other learning rates. After these two stages, the neural network may also be trained at other learning rates according to other optimization modes, that is, the neural network is trained at other learning rates according to other optimization modes switched from the second optimization mode and the second learning rate, which will not be limited in this embodiment.

In this embodiment, the neural network is trained at the first learning rate according to the first optimization mode. The first learning rate is updated each time the neural network is trained. The first learning rate of the first optimization mode is mapped to the second learning rate of the second optimization mode in the same vector space, and it is determined that the second learning rate converges. The neural network is continued to be trained at the second learning rate according to the second optimization mode. Through the mapping of the learning rate in the same vector space, appropriate optimization modes may be switched at different stages to train the neural network, such that the advantages of the appropriate optimization modes are exploited at different stages, the problems caused by other optimization modes are reduced or avoided, and the needs for training the neural network in two dimensionality or more aspects at the same time are satisfied.

Embodiment 2

Figure 4:
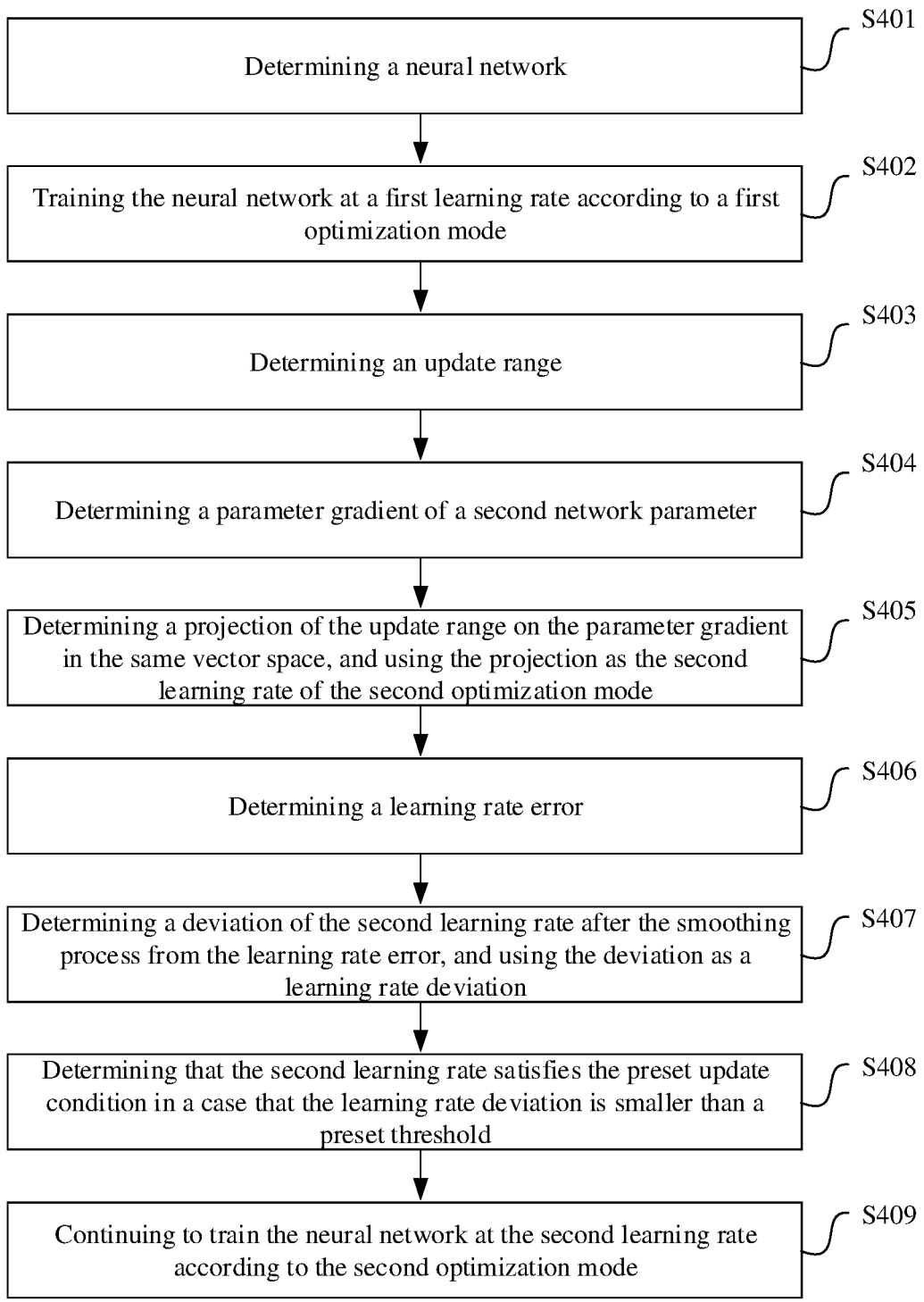
FIG. 4 is a flowchart of a method for training a neural network provided by Embodiment 2 of the present disclosure.

FIG. 4 is a flowchart of a method for training a neural network provided by Embodiment 2 of the present disclosure. This embodiment is based on the foregoing embodiment, and refines operations such as the mapping between the first learning rate and the second learning rate, the convergence of the second learning rate, and the like. The method includes the following steps S401 to S410.

In S401, a neural network is determined.

In S402, the neural network is trained at a first learning rate according to a first optimization mode.

The first learning rate is updated each time the neural network is trained.

In S403, an update range is determined.

The update range represents a range for updating a first network parameter in a case that the neural network is trained at the first learning rate according to the first optimization mode, and the first network parameter represents a parameter of the neural network in a case that the neural network is trained at the first learning rate according to the first optimization mode.

A first-order momentum and a second-order momentum may be determined.

A product of the first learning rate of the first optimization mode and the first-order momentum is calculated as a first target value.

A root of a sum of the second momentum and a preset first value is calculated as a second target value.

A ratio of the first target value to the second target value is determined as a third target value, so as to determine an opposite number from the third target value and take the opposite number as the update range.

In S404, a parameter gradient of a second network parameter is determined.

The second network parameter represents a parameter of the neural network in a case that the neural network is trained at a second learning rate according to a second optimization mode.

In S405, a projection of the update range on the parameter gradient is determined in the same vector space and taken as the second learning rate of the second optimization mode.

In this embodiment, the explanation is performed by taking adaptive moment estimation Adam as the first optimization mode and stochastic gradient descent SGD as the second optimization mode as an example.

In the first optimization mode (such as Adam), the parameter update in the optimization solution process of the neural network may be expressed as:

$$w_{t+1} = w_t + \Delta w_t^{Adam}$$

$$\Delta w_t^{Adam} = -\frac{a_t^{Adam} \cdot m_t}{\sqrt{V_t + \varepsilon}}$$

wherein $w_{t+1}$ is a parameter (i.e., a first network parameter) of the neural network at a $(t+1)^{th}$ moment; $w_t$ is a parameter (i.e., a first network parameter) of the neural network at a $t^{th}$ moment; $\Delta w_t^{Adam}$ is an update range when the neural network is trained with the first optimization mode (e.g., Adam) at the $t^{th}$ moment; $a_t^{Adam}$ is the first learning rate of the first optimization mode (e.g., Adam) at the $t^{th}$ moment; $m_t$ is the first-order momentum at the $t^{th}$ moment; $V_t$ is the second-order momentum at the $t^{th}$ moment; $\varepsilon$ is a first value; and E is generally a constant with a small value, so as to prevent the denominator from being 0.

In the second optimization mode (e.g., SGD), the parameter update in the optimization solution process of the neural network may be expressed as:

$$w_{t+1} = w_t + \Delta w_t^{SGD}$$

$$\Delta w_t^{SGD} = -a_t^{SGD} \cdot g_t$$

wherein $w_{t+1}$ is a parameter (i.e., the second network parameter) of the neural network at the $(t+1)^{th}$ moment; $w_t$ is a parameter (i.e., the second network parameter) of the neural network at the $t^{th}$ moment; $\Delta w_t^{SGD}$ is an update range when the neural network is trained with the second optimization mode (e.g., SGD) at the $t^{th}$ moment; $a_t^{SGD}$ is the second learning rate of the second optimization mode (e.g., SGD) at the $t^{th}$ moment; and $g_t$ is a parameter gradient of the second network parameter at the $t^{th}$ moment.

When the neural network is trained with the first optimization mode (e.g., Adam) and with the second optimization mode (e.g., SGD), values of the same parameter $w_t$ in the neural network will be different. Therefore, the representations of the first network parameter and the second network parameter are distinguished.

In the same vector space, cwt GD may be decomposed into a weighted sum of $\Delta w_t^{Adam}$ and other vector ($\Delta w_t^{Adam_{orth}}$) of the $\Delta w_t^{Adam}$ in its orthogonal direction, expressed as:

$$\Delta w_t^{SGD} = \sigma_1 \Delta w_t^{Adam} + \sigma_2 \Delta w_t^{Adam_{orth}}$$

wherein $\sigma_1$ is a weight of $\Delta w_t^{Adam}$, and $\sigma_2$ is a weight of $\Delta w_t^{Adam_{orth}}$.

Since $\Delta w_t^{SGD}$ and $g_t$ are consistent in direction, a projection of the vector $\Delta w_t^{Adam}$ in the direction of the vector $g_t$ is solved, and the length of the projection is $a_t^{SGD}$.

The update range may be transposed based on the orthogonal projection to obtain a target vector.

A fourth target value and a fifth target value are determined, wherein the fourth target value is a product of the target vector and the update range, and the fifth target value is a product of the target vector and the parameter gradient.

A ratio of the fourth target value to the fifth target value is calculated as the second learning rate of the second optimization mode.

Therefore, the second learning rate of the second optimization mode may be expressed as:

$$a_t^{SGD} = \frac{(\Delta w_t^{Adam})^T \Delta w_t^{Adam}}{(\Delta w_t^{Adam})^T g_t}$$

wherein $(\Delta w_t^{Adam})^T$ is a transposed matrix of $\Delta w_t^{Adam}$, i.e., the target vector.

In this embodiment, since the distributions of samples in each training process are not necessarily the same, there is inevitably jitter noise in the calculation of the second learning rate, and the second learning rate may be smoothed to reduce the jitter noise.

In one embodiment, a first weight and a second weight may be determined; and the sum of the first weight and the second weight is 1.

A smoothed second learning rate at last training of the neural network is determined.

A smoothed second learning rate at this training of the neural network is determined as a sum of a sixth target value and a seventh target value, wherein the sixth target value is a product of the first weight and the smoothed second learning rate at last training of the neural network, and the seventh target value is a product of the second weight and the second learning rate before the smoothing process when the neural network is trained this time.

Therefore, the smoothing process of the second learning rate may be expressed as:

$$\lambda_t = \beta_3 \lambda_{t-1} + (1-\beta_3) a_t^{SGD}$$

wherein $\beta_3$ is the first weight; $(1-\beta_3)$ is the second weight; $\lambda_t$ is the smoothed second learning rate at the $t^{th}$ moment (i.e., the neural network is trained for the $t^{th}$ time); and $\lambda_{t-1}$ is the smoothed second learning rate at the $(t-1)^{th}$ moment (i.e., the neural network is trained for the $(t-1)^{th}$ time).

The first weight is a parameter, and the first-order momentum and the second-order momentum may be determined in order not to introduce more parameters.

An eighth target value and a ninth target value are determined, wherein the eighth target value is a difference between a preset second value and a hyperparameter of the first-order momentum, and the ninth target value is a difference between a preset third value and a hyperparameter of the second-order momentum.

A ratio of a root of the eighth target value to a root of the ninth target value is determined as the first weight.

Therefore, the first weight may be expressed as:

$$\beta_3 = \frac{\sqrt{1-\beta_2}}{\sqrt{1-\beta_1}}$$

wherein $\beta_1$ is a hyperparameter of the one-order momentum; and $\beta_2$ is a hyperparameter of the second-order momentum.

In S406, a learning rate error is determined.

In this embodiment, an update condition set for the second learning rate is value convergence.

Since the value of the second learning rate of the second optimization mode may also be updated each time the neural network is trained, a series of values for the second learning rate may be compared to determine whether the second learning rate has converged in this embodiment.

If the second learning rate is stable, it may be determined that the second learning rate converges.

An error may be introduced to the second learning rate as a learning rate error each time the neural network is trained.

In this embodiment, the smoothed second learning rate and a target hyperparameter are determined, and the target hyperparameter is configured to control the second learning rate for training the neural network this time.

A ratio of a target learning rate to a tenth target value is determined as the learning rate error, wherein the tenth target value is a difference between the preset fourth value and the target hyperparameter.

Therefore, the learning rate error may be expressed as:

$$\tilde{\lambda}_t = \frac{\lambda_t}{1-\beta_3^t}$$

wherein $\tilde{\lambda}_t$ is the learning rate error at the $t^{th}$ moment; $\lambda_t$ is the smoothed second learning rate at the $t^{th}$ moment, and an example value of the fourth value is 1; and $\beta_3^t$ is the target hyperparameter, which is used to control how much the second learning rate obtained at the $t^{th}$ moment is determined at the $(t-1)^{th}$ moment.

In S407, a deviation of the second learning rate from the learning rate error is determined as a learning rate deviation.

In S408, it is determined that the second learning rate satisfies a preset update condition in a case that the learning rate deviation is smaller than a preset threshold.

In this embodiment, the deviation between the second learning rate and the learning rate error can be calculated as the learning rate deviation. If the learning rate deviation is less than the preset threshold, it can be considered that the value of the second learning rate converges and satisfies the update condition, and the neural network can be continued to be trained at the second learning rate according to the second optimization mode. If the learning rate deviation is greater than or equal to the preset threshold, it is confirmed that the value of the second learning rate fails to converge and does not satisfy the update condition, and the next training is continued to be performed at the first learning rate according to the first optimization mode.

In one embodiment, a difference between the learning rate error and the second learning rate may be determined as an eleventh target value, and an absolute value of the eleventh target value is determined as the learning rate deviation.

Therefore, a condition for convergence may be expressed as:

$$|\tilde{\lambda}_t - a_t^{SGD}| < \varepsilon$$

wherein $a_t^{SGD}$ may be the second learning rate before the smoothing process, or the second learning rate after the smoothing process; and $\varepsilon$ is a threshold.

In S409, the neural network is continued to be trained at the second learning rate according to the second optimization mode.

Embodiment 3

Figure 5:
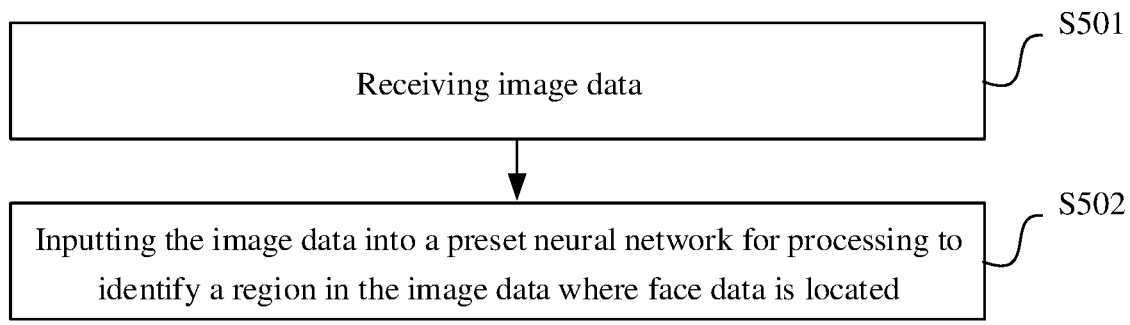
FIG. 5 is a flowchart of a method for detecting a face provided by Embodiment 3 of the present disclosure.

FIG. 5 is a flowchart of a method for detecting a face provided by Embodiment 3 of the present disclosure. This embodiment may be applied to a case where a neural network trained with two or more optimization modes is used for detecting a face. An apparatus for training a neural network may be implemented by software and/or hardware, and may be configured in a computer device, such as a personal computer, a mobile terminal (such as a mobile phone or a tablet computer), a wearable device (such as smart watches or smart glasses) or the like. The method includes the following steps S501 to S502.

In S501, image data is received.

In one embodiment, an operating system of the computer device may include Android, IOS, Windows, and the like.

These operating systems support running applications that can perform image processing, such as a short video application, a live-streaming application, an image editing application, a camera application, an instant messaging tool, a gallery application, and the like.

A user interface (UI) of the image editing application, the instant messaging tool, the gallery application or other application may provide an imported control, and the user can operate the imported control by touching or a peripheral such as a mouse to select locally stored image data (represented by thumbnails or paths), or select image data stored in a network (represented by uniform resource locators, URL)), such that the application acquires the image data.

A UI of the short video application, the live-streaming application, the image editing application, the camera application, the instant messaging tool or other application may provide a control for taking pictures and videos, and the user can operate the control for taking pictures and videos by touching or a peripheral such as a mouse to notify the application to call the camera to collect image data.

In S502, the image data is inputted into a preset neural network for processing to identify a region in the image data where face data is located.

A neural network may be preconfigured in a computer device and used to detect a location of the face data.

The received image data is inputted into the neural network, and the neural network performs processing according to its own logic, and outputs a region in the image data where the face data is located.

Figure 6:
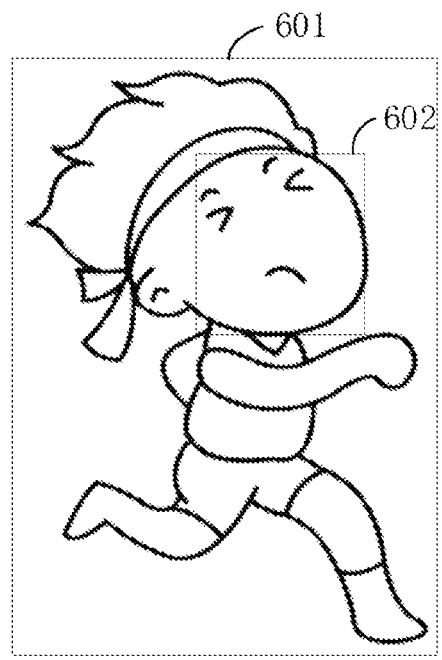
FIG. 6 is an example diagram of face detection provided by Embodiment 3 of the present disclosure.

For example, as shown in FIG. 6, the user starts the short video application and captures a short video in a sports meeting, image data 601 in the short video is inputted into the neural network, and the neural network may output a region 602 in the image data 601 where the face of an athlete is located.

For the region in the image data where the face data is located, the application can perform other processing such as a beauty mode. For example, key points of the face are detected in this region, and the key points of the face are used for processing such as stretching or scaling, or added with decorations.

In this embodiment, the image data that indicates the region where the face data is located is provided as a sample. The neural network is trained through the methods for training a neural network provided in Embodiment 1 and Embodiment 2.

In one embodiment, the method for training a neural network includes: determining a neural network; training the neural network at a first learning rate according to a first optimization mode, wherein the first learning rate is updated each time the neural network is trained; mapping the first learning rate of the first optimization mode to a second learning rate of a second optimization mode in the same vector space; determining that the second learning rate satisfies a preset update condition; and continuing to train the neural network at the second learning rate according to the second optimization mode.

The step of mapping the first learning rate of the first optimization mode to the second learning rate of the second optimization mode in the same vector space includes: determining an update range, wherein the update range represents a range for updating a first network parameter in a case that the neural network is trained at the first learning rate according to the first optimization mode, and the first network parameter represents a parameter of the neural network in a case that the neural network is trained at the first learning rate according to the first optimization mode; determining a parameter gradient of a second network parameter, wherein the second network parameter represents a parameter of the neural network in a case that the neural network is trained at the second learning rate according to the second optimization mode; and determining a projection of the update range on the parameter gradient in the same vector space, and taking the projection as the second learning rate of the second optimization mode.

The step of determining the update range includes: determining a first-order momentum and a second-order momentum; determining a ratio of a first target value to a second target value as a third target value, wherein the first target value is a product of the first learning rate of the first optimization mode and the first-order momentum, and the second target value is a root of a sum of a second momentum and a preset first value; and determining an opposite number of the third target value as the update range.

The step of determining the projection of the update range on the parameter gradient in the same vector space and taking this projection as the second learning rate of the second optimization mode includes: obtaining a target vector by transposing the update range; determining a fourth target value and a fifth target value, wherein the fourth target value is a product of the target vector and the update range, and the fifth target value is a product of the target vector and the parameter gradient; and calculating a ratio of the fourth target value to the fifth target value as the second learning rate of the second optimization mode.

The step of mapping the first learning rate of the first optimization mode to the second learning rate of the second optimization mode in the same vector space further includes: smoothing the second learning rate.

The step of smoothing the second learning rate includes: determining a first weight; determining a second weight; determining a smoothed second learning rate at the last training of the neural network; determining a smoothed second learning rate at this training of the neural network as a sum of a sixth target value and a seventh target value, wherein the sixth target value is a product of the first weight and the smoothed second learning rate at the last training of the neural network, and the seventh target value is a product of the second weight and the second learning rate.

The step of determining the first weight includes: determining a first-order momentum and a second-order momentum; determining an eighth target value and a ninth target value, wherein the eighth target value is a difference between a preset second value and a hyperparameter of the first-order momentum, and the ninth target value is a difference between a preset third value and a hyperparameter of the second-order momentum; and determining a ratio of an arithmetic square root of the eighth target value to an arithmetic square root of the ninth target value, and taking the ratio of the arithmetic square root of the eighth target value to the arithmetic square root of the ninth target value as the first weight.

The step of determining that the second learning rate satisfies the preset update condition includes: determining a learning rate error; determining a deviation of the smoothed second learning rate from the learning rate error, and taking the deviation as a learning rate deviation; and determining that the second learning rate satisfies the preset update condition in a case that the learning rate deviation is smaller than a preset threshold.

The step of determining the learning rate error includes: determining the smoothed second learning rate; determining a target hyperparameter, the target hyperparameter being configured to control the second learning rate when the neural network is trained this time; and determining a ratio of the smoothed second learning rate to a tenth target value, and taking the ratio of the smoothed second learning rate to the tenth target value as the learning rate error, wherein the tenth target value is a difference between the preset fourth value and the target hyperparameter.

The step of determining the deviation of the second learning rate from the learning rate error and taking this deviation as the learning rate deviation includes: determining a difference between the learning rate error and the second learning rate, and taking the difference between the learning rate error and the second learning rate as an eleventh target value; and determining an absolute value of the eleventh target value and taking this absolute value as the learning rate deviation.

In an exemplary embodiment, the neural network includes a convolutional neural network CNN, the first optimization mode includes adaptive moment estimation Adam, and the second optimization mode includes stochastic gradient descent SGD.

In this embodiment, since the method for training a neural network is similar to that in Embodiment 1 and Embodiment 2, the description is relatively simple. Related parts may refer to the descriptions of Embodiment 1 and Embodiment 2, and are thus not described in detail in this embodiment.

Since the training of the neural network is relatively complex, the neural network can be trained offline on other computer devices; and after the training of the neural network is completed, the neural network is distributed to the current computer device.

If the performances of the current computer device are relatively high, or, for example, a server provides face detection services for other computer devices, the neural network may be directly trained on the current computer device, which is not limited in this embodiment.

In this embodiment, the image data is received and input to a preset neural network for processing to identify a region in the image data where the face data is located. Through the mapping of the learning rate in the same vector space, appropriate optimization modes may be switched at different stages to train the neural network, such that the advantages of the appropriate optimization modes are exploited at different stages, the problems caused by other optimization modes are reduced or avoided, and the needs for training the neural network in two dimensionality or more aspects at the same time are satisfied, thereby improving the performances of the neural network and ensuring the face detection effect.

For example, in the course of network training, the neural network is trained with adaptive moment estimation Adam in the previous stage, which can ensure the training speed of the neural network and achieve rapid descent and convergence; and the neural network which is trained with stochastic gradient descent SGD in the later stage can ensure the generalization ability of the neural network, improve the training speed of the neural network and further improve an update speed of the neural network. The neural network adapts to different samples, which can improve the accuracy of the neural network for face detection, and ensure the generalization ability of the neural network, thereby ensuring the accuracy of the neural network for face detection under the same sample conditions.

Embodiment 4

Figure 7:
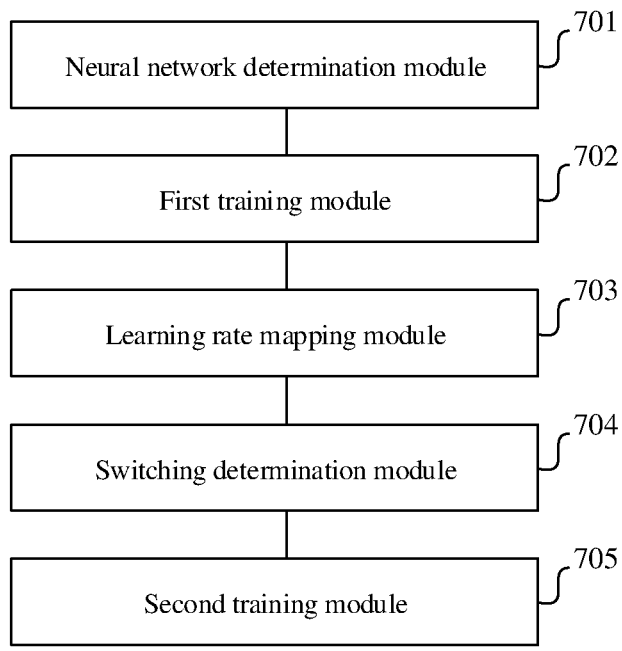
FIG. 7 is a schematic structural diagram of an apparatus for training a neural network provided by Embodiment 4 of the present disclosure.

FIG. 7 is a schematic structural diagram of an apparatus for training a neural network provided by Embodiment 4 of the present disclosure. The apparatus may include the following modules: a neural network determination module 701 configured to determine a neural network; a first training module 702 configured to train the neural network at a first learning rate according to a first optimization mode, wherein the first learning rate is updated each time the neural network is trained; a learning rate mapping module 703 configured to map the first learning rate of the first optimization mode to a second learning rate of a second optimization mode in the same vector space; a switching determination module 704 configured to determine that the second learning rate satisfies a preset update condition; and a second training module 705 configured to continue to train the neural network at the second learning rate according to the second optimization mode.

The apparatus for training a neural network provided by this embodiment of the present disclosure can execute the method for training a neural network provided by any embodiment of the present disclosure, and has corresponding functional modules and effects for executing the method.

Embodiment 5

Figure 8:
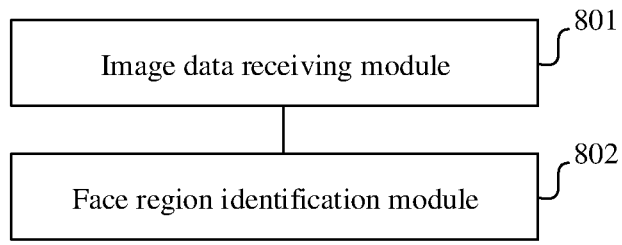
FIG. 8 is a schematic structural diagram of an apparatus for detecting a face provided by Embodiment 5 of the present disclosure.

FIG. 8 is a schematic structural diagram of an apparatus for detecting a face provided by Embodiment 3 of the present disclosure. The apparatus may include the following modules: an image data receiving module 801 configured to receive image data; and a face region identification module 802 configured to input the image data into a preset neural network for processing to identify a region in the image data where face data is located, wherein the neural network is trained by the neural network training apparatus provided in Embodiment 4.

The apparatus for detecting a face provided by this embodiment of the present disclosure can execute the method for detecting a face provided by any embodiment of the present disclosure, and has corresponding functional modules and beneficial effects for executing the method.

Embodiment 6

Figure 9:
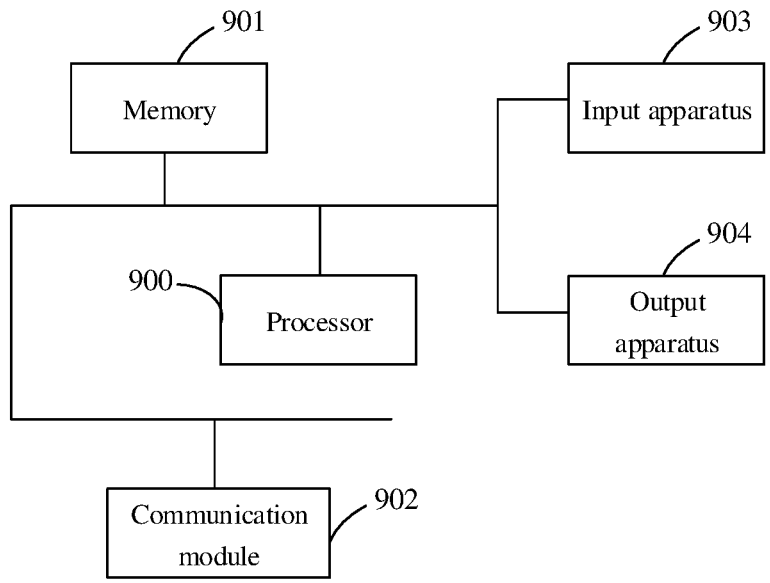
FIG. 9 is a schematic structural diagram of a computer device according to Embodiment 6 of the present disclosure.

FIG. 9 is a schematic structural diagram of a computer device according to Embodiment 6 of the present disclosure. As shown in FIG. 9, the computer device includes a processor 900, a memory 901, a communication module 902, an input apparatus 903 and an output apparatus 904. The number of processors 900 in the computer device may be one or more, and one processor 900 is taken as an example in FIG. 9. The processor 900, the memory 901, the communication module 902, the input apparatus 903 and the output apparatus 904 in the computer device may be connected by a bus or in other ways, and the connection by the bus is taken as an example in FIG. 9.

A computer device provided by this embodiment can execute the method for training a neural network or the method for detecting a face provided by any embodiment of the present disclosure, and has corresponding functions and effects.

Embodiment 7

Embodiment 7 of the present disclosure further provides a computer-readable storage medium configured to store a computer program therein. The computer program, when executed by a processor, implements a method for training a neural network. The method includes: determining a neural network; training the neural network at a first learning rate according to a first optimization mode, wherein the first learning rate is updated each time the neural network is trained; mapping the first learning rate of the first optimization mode to a second learning rate of a second optimization mode in the same vector space; determining that the second learning rate satisfies a preset update condition; and continuing to train the neural network at the second learning rate according to the second optimization mode.

Alternatively, the computer program, when executed by the processor, implements a method for detecting a face. The method includes: receiving image data; and inputting the image data into a preset neural network for processing to identify a region in the image data where face data is located, wherein the neural network is trained through a neural network training method, the neural training method including: determining a neural network; training the neural network at a first learning rate according to a first optimization mode, wherein the first learning rate is updated each time the neural network is trained; |mapping the first learning rate of the first optimization mode to a second learning rate of a second optimization mode in the same vector space; determining that the second learning rate satisfies a preset update condition; and continuing to train the neural network at the second learning rate according to the second optimization mode.

According to the computer-readable storage medium provided by this embodiment of the present disclosure, a computer program thereof is not limited to the above-mentioned method operations, and may also perform related operations in the neural network training method or the method for detecting a face provided by any embodiment of the present disclosure.

From the above description of the embodiments, it can be clearly understood by a person skilled in the art that the present disclosure may be realized by means of software and necessary general-purpose hardware, or the present disclosure may also be realized by hardware and embodied in the form of software products. The computer software product may be stored in a computer-readable storage medium, and includes several instructions to cause a computer device (which may be a personal computer, a server or a network device) to implement the method according to each of the embodiments of the present disclosure, the computer-readable storage medium including a floppy disk of a computer, a read-only memory (ROM), a random access memory (RAM), a flash, a hard disk, an optical disk, or the like.

In the embodiment of an apparatus for training a neural network or the apparatus for detecting a face, each unit and module included therein are only divided according to functional logic, but not limited to the above division, as long as the corresponding functions can be realized. In addition, the specific name of each functional unit is only for the convenience of distinguishing each other, and is not used to limit the protection scope of the present disclosure.

What is claimed is:

1. A method for detecting a face, comprising:
receiving image data; and
identifying a region in the image data where face data is located by inputting the image data into a preset neural network for processing, wherein the preset neural network is trained by a method for training a neural network and the method for training a neural network comprises:
determining a neural network;
training the neural network at a first learning rate according to a first optimization mode, wherein the first learning rate is updated each time the neural network is trained; | mapping the first learning rate of the first optimization mode to a second learning rate of a second optimization mode in the same vector space;
determining the second learning rate satisfies a preset update condition; and
continuing to train the neural network at the second learning rate according to the second optimization mode; and
wherein the mapping the first learning rate of the first optimization mode to the second learning rate of the second optimization mode in the same vector space comprises:
determining an update range, wherein the update range represents a range for updating a first network parameter in a case that the neural network is trained at the first learning rate according to the first optimization mode, and the first network parameter represents a parameter of the neural network in a case that the neural network is trained at the first learning rate according to the first optimization mode;
determining a parameter gradient of a second network parameter, wherein the second network parameter represents a parameter of the neural network in a case that the neural network is trained at the second learning rate according to the second optimization mode; and
determining a projection of the update range on the parameter gradient in the same vector space as the second learning rate of the second optimization mode.

2. The method according to claim 1, wherein the determining the update range based on the first learning rate of the first optimization mode comprises:
determining a first-order momentum and a second-order momentum;
determining a ratio of a first target value to a second target value as a third target value, wherein the first target value is a product of the first learning rate of the first optimization mode and the first-order momentum, and the second target value is a root of a sum of a second momentum and a preset first value; and
determining an opposite number of the third target value as the update range.

3. The method according to claim 1, wherein the determining the projection of the update range on the parameter gradient in the same vector space and taking the projection as the second learning rate of the second optimization mode comprises:
obtaining a target vector by transposing the update range;
determining a fourth target value and a fifth target value, wherein the fourth target value is a product of the target vector and the update range, and the fifth target value is a product of the target vector and the parameter gradient; and
calculating a ratio of the fourth target value to the fifth target value as the second learning rate of the second optimization mode.

4. The method according to claim 1, wherein the determining the update range based on the first learning rate of the first optimization mode further comprises:
smoothing the second learning rate.

5. The method according to claim 4, wherein the smoothing the second learning rate comprises:
determining a first weight;
determining a second weight;
determining a smoothed second learning rate at last training of the neural network; and
determining a smoothed second learning rate at this training of the neural network as a sum of a sixth target value and a seventh target value, wherein the sixth target value is a product of the first weight and the smoothed second learning rate at last training of the neural network, and the seventh target value is a product of the second weight and the second learning rate.

6. The method according to claim 5, wherein the determining the first weight comprises:
  determining a first-order momentum and a second-order momentum;
  determining an eighth target value and a ninth target value, wherein the eighth target value is a difference between a preset second value and a hyperparameter of the first-order momentum, and the ninth target value is a difference between a preset third value and a hyperparameter of the second-order momentum; and
  determining a ratio of a root of the eighth target value to a root of the ninth target value as the first weight.

7. The method according to claim 1, wherein the determining that the second learning rate satisfies the preset update condition comprises:
  determining a learning rate error;
  determining a deviation of the second learning rate from the learning rate error as a learning rate deviation; and
  determining the second learning rate satisfies the preset update condition in a case that the learning rate deviation is smaller than a preset threshold.

8. The method according to claim 7, wherein the determining the learning rate error comprises:
  determining the smoothed second learning rate;
  determining a target hyperparameter, wherein the target hyperparameter is configured to control the second learning rate for training the neural network this time; and
  determining a ratio of a target learning rate to a tenth target value as the learning rate error, wherein the tenth target value is a difference between a preset fourth value and the target hyperparameter.

9. The method according to claim 7, wherein the determining the deviation of the second learning rate from the learning rate error as the learning rate deviation comprises:
  determining a difference between the learning rate error and the second learning rate as an eleventh target value; and
  determining an absolute value of the eleventh target value as the learning rate deviation.

10. The method according to claim 1, wherein the neural network comprises a convolutional neural network (CNN), the first optimization mode comprises an adaptive moment estimation (Adam), and the second optimization mode comprises a stochastic gradient descent (SGD).

11. An apparatus for detecting a face, wherein the apparatus for detecting a face is configured to implement the method for detecting a face according to claim 1.

12. A computer device, comprising:
  at least one processor; and
  a memory configured to store at least one program therein, wherein
  the at least one program, when executed by the at least one processor, causes the at least one processor to implement the method for detecting a face according to claim 1.

13. A computer-readable storage medium configured to store a computer program therein, wherein the computer program, when executed by a processor, causes the processor to implement the method for detecting a face according to claim 1.

* * * * *